May 30, 1933.  E. WANDSCHEER  1,912,231
AUTOMOBILE COVER
Filed Dec. 12, 1931  2 Sheets-Sheet 1
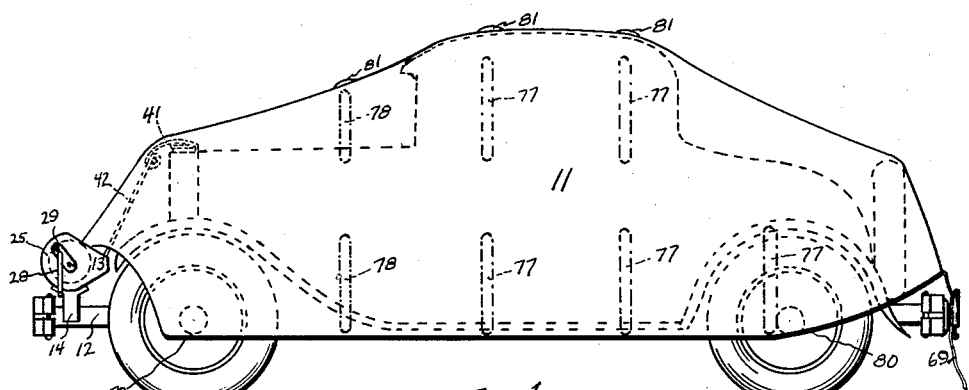
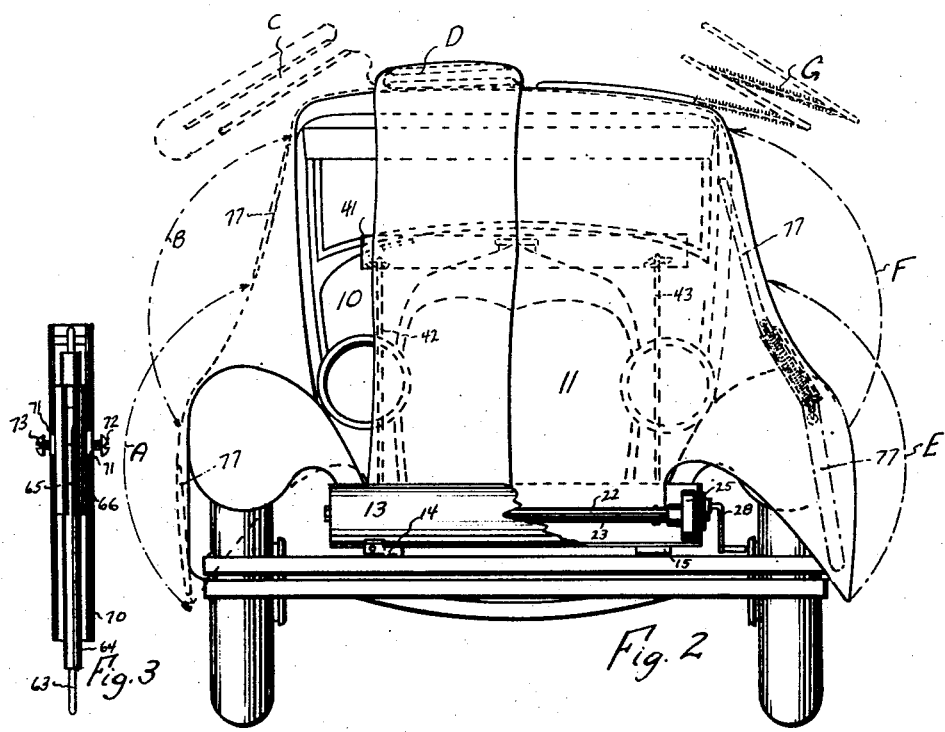
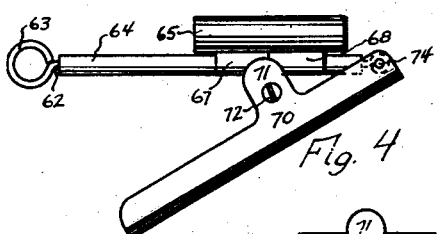
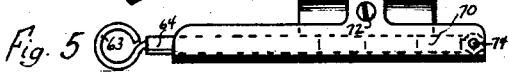

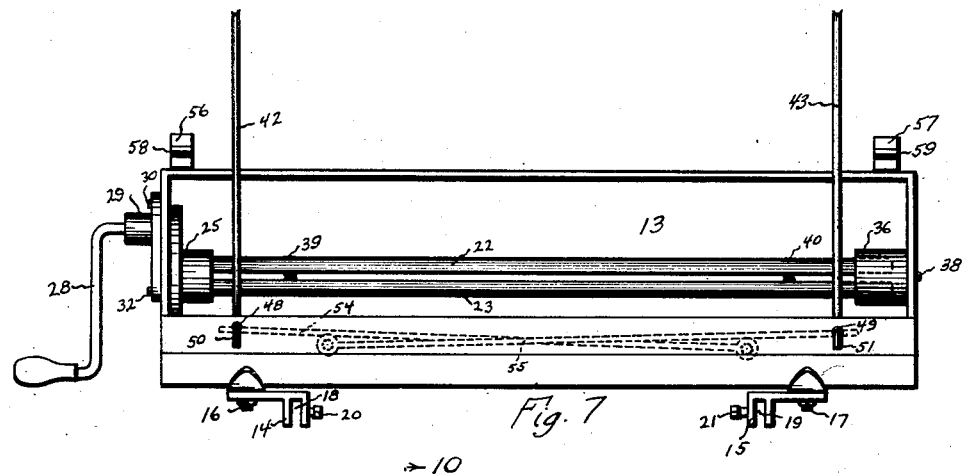

Patented May 30, 1933

1,912,231

UNITED STATES PATENT OFFICE

EVERT WANDSCHEER, OF SPRINGFIELD, SOUTH DAKOTA

AUTOMOBILE COVER

Application filed December 12, 1931. Serial No. 580,642.

My invention relates to a collapsible cover which can be drawn over an automobile and secured to protect the automobile from the elements and for other reasons.

An object of my invention is to provide such a cover which can be readily positioned and drawn over the automobile with a minimum of time and labor.

A further object of my invention is to provide a winding arrangement to wind up the cover in a convenient manner after the said cover has been used.

A further object of my invention is to provide a cover which will remain in a comparatively secure position and will not be affected by a strong wind or other elements which may tend to remove the cover in undesirable weather conditions.

Another object of my invention is to provide a winding arrangement which will serve to keep the tent structure comparatively taut when it is wound up on the reel provided, so that the collapsible tent structure will not be blown about when it is wound.

A further object of my invention is to provide such an automobile cover which can be made quite simply and with a minimum of parts.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side elevation showing the cover over a car,

Figure 2 is a front view of Figure 1, and also shows how the collapsible cover is folded up, Figure 3 is a plan view of the tightening device, Figure 4 is a side view of Figure 3, Figure 5 is the same view of this device as in Figure 4 except that the device is closed, Figure 6 is a front view of Figure 5, Figure 7 is a plan view of the winding reel and case, Figure 8 is a rear view of the shield attached to a radiator cap, Figure 9 is an enlarged sectional view of Figure 11 taken along the lines 9—9 and shows the winding arrangement in detail, Figure 10 is a sectional view of Figure 8 taken generally along the lines 10—10, Figure 11 is a view of the winding arrangement and case, Figure 12 is an enlarged view of the spring and stiffener device.

I have used the reference character 10 to designate generally the automobile itself, and the complete fabric cover is indicated by the character 11.

Affixed to the front bumper bars 12 of the car is the winding case 13. The case 13 is attached to the bars 12 by means of small brackets 14 and 15. These brackets 14 and 15 are suitably attached to the case at 16 and 17 by any satisfactory method such as bolting, etc., and these brackets include the openings 18 and 19 for slipping over the bumper bars.

The small cap screws 20 and 21 provide tightening means for the brackets.

The winding arrangement shall next be described. A pair of half round metal bars 22 and 23 are adapted to be received within the recessant portion 24 of the element 25, which is a gear of the internal type having its gear teeth on the inside as at 26. A smaller external gear 27 is arranged to drive the gear 25 (see Figure 9).

The small gear 27 is firmly pinned to the handle 28 which passes through the member 29, which member acts as a bearing.

The member 29 is secured to the case 13 at its upper portion by the cap screw 30 and includes an extended portion 31 at its lower portion and through it the cap screw 32 passes.

The cap screw 32 includes the extended portion 33. This extended portion is positioned so that the gear 25 rotates freely about it as an axis.

A rivet 34 passes through the two half round portions 22 and 23 as shown and the space 35 is left between these two half round portions, the purpose of which will be explained later.

The other inside end of the case 13 includes the bearing 36 which receives the other ends of the half round elements. This bearing is secured at 37 by means of the cap screw 38.

A pair of screws 39 and 40 pass through the half round elements as shown and are adapted to secure the end of the fabric element 11.

The shield 41 (see Figures 8 and 10) is arranged to be positioned adjacent the radiator cap of an automobile and includes the extending prongs 42a of which there are two and arranged to snugly fit around the radiator cap to hold the shield 41 in place.

A pair of rods 42 and 43 are secured to the inside of the shield 41 by means of elements 44 and 45.

These elements are welded or suitably secured to the inside of the shield at their inner ends as at 44a and 45a.

A pair of openings 46 and 47 are also included in the shield 41 as shown.

The rods 42 and 43 are arranged to pass through openings 48 and 49 in the case 13 and are slightly bent outwardly and thence again downwardly at 50 and 51 so they will be secured firmly thereto.

When it is desired to fold up the rods 42 and 43 within the case 13, the loop portions 52 and 53, which are at the shield ends of the rods, are slipped outwardly over the rods 44 and 45 and are then folded as shown in the dotted positions as at 54 and 55, (see Figure 7).

It will be understood that the arrangement at 42a for passing around the radiator cap can be made in any way just so it is secured to the shield. This shield 41 is so constructed that after the tent structure is wound up fully on the reel, the shield can be placed directly on the open portion of the semi-cylindrical case 13. To secure the shield in this position the swinging lugs 56 and 57 are provided, which are suitably mounted on the case 13 in swinging relation, which can be effected by means of pins.

When the shield 41 is used in this manner as a cover over the case 13, the lugs 56 and 57 are swung so that their extending portions 58 and 59 are received by the open slots 46 and 47 in the shield.

The flange portion 60 of the shield passes just within the portion 61 of the case and by virtue of this whole arrangement, it will be seen that the shield 41 provides a comparatively snug fitting cover for the winding mechanism.

This shield provides a further important function which will be described later.

Figure 4, shows the small auxiliary device which is used to secure the cover structure at the rear end of the automobile and further serves as a tensioning means when the cover is drawn over the car into the case. It consists of the pin 62, the end of which, is made in a loop form as at 63.

The pin is covered by an additional collar 64 and receives the hinge structure which comprises the two hinge leaves 65 and 66. These hinges are made in the conventional way similar to a door hinge as shown at 67 and 68, and these elements 65 and 66 are arranged so that they can be swung outwardly or inwardly so as to grasp the rope, which rope is shown in section at 69.

The U shaped arm 70 is provided with the upwardly extending portions 71, which includes the adjusting screws 72 and 73. The U shaped arm 70 is pinned to the pin 62 as at 74.

It will be seen from this construction that when it is desired to tighten the rope within the leaves 65 and 66 the U shaped element 70 is drawn upwardly so that the screws 72 and 73 press against the portions 75 and 76 of the leaves and tend to constrict them inwardly about the rope. The closed position as thus explained is shown in Figure 5.

I shall now explain the cover more fully. The cover is any suitable good weather resisting fabric such as canvas or the like and includes a number of metal weights such as 77 and 78, which besides serving as weights to keep the cover snugly against the automobile, also serve as stiffeners so that the tent structure can be easily folded and unfolded, (see Figure 2). These metal weights or stiffeners are merely sewed inside of flaps as 81. These flaps are sewed around the perimeters of the weights and to the cover, thus securing them.

The arrows show the successive folding operations at A, B, C, and then D.

It can be seen from the respective dotted positions of the cover how these stiffeners are positioned so that the entire cover is a semi-rigid structure, which can be folded up in consecutive folds, so that the cover can be easily rolled up on the reel without causing any attendant jamming or any other undesirable results.

Loops can be provided at 79 and 80 if desired to pass around the hub caps and provide additional securing means, although this is not really necessary by virtue of the weights holding the cover in a substantially secure position.

The extreme forward end of the entire cover is slipped in between the two half round bars 22 and 23 and can be arranged so that this end slips between the screws 39 and 40 or can be arranged so that the screws 39 and 40 pass through the end, especially if the end is wider at this point. Then by tightening down the screws 39 and 40, which are ordinary flat head screws, the half round bars will tend to restrict the end of the cover and secure it firmly in the space 35.

It can be seen that the half round bars are free to move along the pin 34 since there is sufficient clearance around the pin.

I shall now proceed to explain how my cover is used.

When it is desired to draw the cover structure over the car, the shield 41 is positioned on the radiator cap as was before described and with the arms 42 and 43 keeping it rigid. The rope 69 which is relatively long is passed over the car to the rear, and the entire cover is drawn out of the case 13 in its folded up position as shown approximately on the left hand side of Figure 2. The sides are then folded downwardly by means of the weights and the rope 69 passes through the tightening arrangement as shown in Figure 4, which tightening arrangement is then clamped shut to secure the rope.

The tightening arrangement can be secured at a suitable point in the rear of the automobile by the means of the eye portion 63.

It will be seen that the shield 41 provides a guiding member when the cover is drawn over the car since its upper portion consists of an arc and which is relatively long so the cover will be guided uniformly.

When it is desired to roll up the cover after it has been used, the rear holder arrangement can be used as a means for providing a constant tension so that in case a strong wind is blowing, the cover will still be held securely until it is finally drawn into the case. This tension is maintained by the U-shaped portion 70.

The screws 72 and 73 can be loosened slightly so that the grip on the rope is not too secure and when the handle 28 of the reel is wound, the rope will constantly be kept passing through the portion between the leaves 65 and 66 of the hinge, and the entire cover will be kept under a fairly firm tension as long as it is being wound.

It will be understood that before the cover is wound on the reel, it is folded up to the top of the automobile as shown in Figure 2.

The shield 41, when folding, provides the same means for uniform and more efficient guiding and winding of the cover.

The gear arrangement wherein the small gear 27 meshes with the larger gear 25 provides a superior arrangement for winding the cover since it provides for a great deal more power, which is necessary with a heavier cover of this type and the tension applied on the rope 69. After the cover is wound completely within the case, the shield 41 is again used as a cover for the substantially semi-cylindrical case 13.

I have provided an alternative arrangement for folding up the cover to the top of the car. (See Figure 12.) This arrangement consists of the weight or stiffening elements 82. Between these elements is stretched the spring 83, the ends of which spring include the loops 84 and 85, which pass through the openings 86 and 87 in the weights 82.

The cut out portions 88 and 89 are further provided in the stiffening elements. These stiffeners are spaced by means of rectangular loop 90, which provides a hingeing action at 91 and 92.

It will be seen in Figure 2 at E, F, and G how same folding operation can be provided in nearly the same manner.

As soon as the lower weight is moved up slightly in the folding movement, the spring 83 is thrown off the dead center of the arrangement shown in Figure 12, and the spring will clasp the lower weight 82 against the loop portion 90 and then in further folding, the spring will again be thrown off center on the upper weight except in the other direction, and in this manner, by successive movements, the cover will be raised and folded more conveniently to the top of the car.

The automobile can be used and driven about with the case 13 in position on the bumper, which case is out of the way and in its most convenient position.

It can be seen that I have provided a cover for an automobile which will fulfill a variety of purposes such as covering the car in any emergency or at any desired time.

I have provided such an arrangement which can be very conveniently positioned on the automobile by an efficient winding arrangement and which arrangement comprises a minimum number of parts to accomplish the results in the most satisfactory manner.

I have also provided such a cover for automobiles which is of a semi-rigid character, which in itself is an advantage from many standpoints.

Among these advantages it may be mentioned that a cover of this type may remain more securely positioned on the automobile and also provides means for convenient folding of the cover.

I have also provided tensioning means so that the cover can be drawn into its case with a constant tension being applied at the rear of the automobile so that in a case of strong winds and so forth, the cover will not be blown about.

I have also provided a winding arrangement which gives sufficient power to accomplish the above mentioned means.

Furthermore I have provided an automobile cover of this type which is simple and easy of manufacture.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A collapsible covering structure for automobiles or other vehicles, comprising, a cover, adapted to be received in a casing secured to the front of the car said casing being substantially semi-cylindrical, and having an opening inclined rearwardly, and a shield for guiding the cover uniformly when it is drawn over the vehicle.

2. A collapsible covering structure for automobiles or other vehicles comprising, a cover, adapted to be received in a casing secured to the front of the car, said casing being substantially semi-cylindrical, and having an opening inclined rearwardly, and a shield for guiding the cover uniformly when it is drawn over the vehicle, said shield including prongs for securing it to a radiator cap.

3. A collapsible covering structure for automobiles or other vehicles comprising, a cover, adapted to be received in a casing secured to the front of the car, said casing being substantially semi-cylindrical, and having an opening inclined rearwardly, and a shield for guiding the cover uniformly when it is drawn over the vehicle, said shield including prongs for securing it to a radiator cap, and a pair of rods for securing it in firm relation to the casing.

4. A cover for automobiles or other vehicles including means for folding said cover on the top of the vehicle, said means comprising stiffeners or spring connected elements hinged together to facilitate folding of the cover in successive folds upwardly and over the vehicle top.

5. A cover for automobiles or other vehicles including means for folding said cover on the top of the vehicle, said means comprising stiffeners or spring connected elements hinged together to facilitate folding of the cover in successive folds upwardly and over the vehicle top, said cover adapted to be reeled upon a reel secured to the front bumper of the car after it is folded.

6. A cover for automobiles or other vehicles including means for folding said cover on the top of the vehicle, said means comprising stiffeners or spring connected elements hinged together to facilitate folding of the cover in successive folds upwardly and over the vehicle top, said cover adapted to be reeled upon a reel secured to the front bumper of the car after it is folded, and a substantially semi-cylindrical member, including prongs for engagement with a radiator cap, said member providing means for guiding the cover during the reeling operation, and further providing covering means for the reel.

Signed at Springfield, South Dakota, this 21st day of November, 1931.

EVERT WANDSCHEER.